Figure 1:
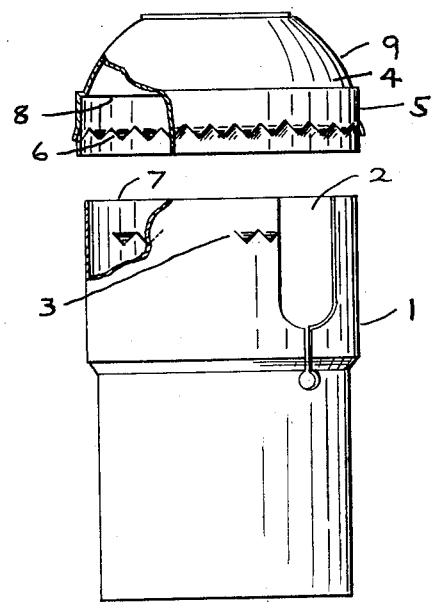

April 24, 1934.  G. H. ELWELL  1,956,320

ELECTRIC LAMP SOCKET SHELL

Filed Aug. 17, 1927  2 Sheets-Sheet 1

INVENTOR

George Henry Elwell

April 24, 1934.  G. H. ELWELL  1,956,320
ELECTRIC LAMP SOCKET SHELL
Filed Aug. 17, 1927   2 Sheets-Sheet 2

INVENTOR
George Henry Elwell

Patented Apr. 24, 1934

1,956,320

UNITED STATES PATENT OFFICE 1,956,320

ELECTRIC LAMP SOCKET SHELL

George Henry Elwell, New Haven, Conn., assignor to The Greist Manufacturing Company, a corporation of Connecticut Application August 17, 1927, Serial No. 213,668

3 Claims. (Cl. 173—362)

The invention relates to improvements in electric lamp socket shells and especially to such shells of the two-part type comprising a cap and shell provided with interlocking means to hold the two parts in separable assembled inter-relation and for preventing relative rotary movement while so assembled.

Previous to this improvement such inter-locking means has been accomplished by providing the shell member of the socket with one or more outwardly extending projections near the key-slot and at a diametrically opposite point adapted to interlock with openings provided by the flange of the cap member or by a ring held within the flange. In order to avoid difficulty in placing the position of the key-slot when the socket is assembled and connected to a fixture, the flange of the cap has been provided with a series of openings around the entire circumference thereof by permitting the shell to be inserted within the cap in any desired relative rotary relation of the two parts. To overcome the weakened condition of the cap by reason of such openings the art reveals certain improvements providing the flange of the cap with an interior ring having the openings, or an exterior reinforcing ring covering openings, in the flange. Other improvements dispense entirely with both inner and outer rings by the provision of imperforate formations on both parts and adapted to inter-lock, but in such formations it has been thought necessary to employ two distinct forms of inter-locking means provided by both parts, one form to lock against axial separation and the other form to lock against relative rotary movement of the parts. Therefore, nowhere in the art, so far as is known, is there revealed any provision whereby the two parts may be locked against axial separation and relative rotary movement by one uniform type of imperforate interlocking formations extending in series around the flange of the cap and provided by the shell. The principal object of this invention, therefore, is to provide one form of imperforate inter-locking formations on the cap and the shell that will lock the two-part socket not only against axial separation but also against relative rotation. Another object of the invention is to provide the socket members with an inter-locking means of such cap flange formation as shall be decorative as well as effectual. And a further object is to provide a cap and shell inter-locking means of such construction that the socket casing provided therewith can be manufactured with the least number of operations so far as the inter-locking means is involved and therefore at low cost. With these and other objects in view, as will more fully hereinafter appear, the invention consists in certain features of novel construction and arrangement of parts hereinafter described, illustrated in the accompanying drawings and particularly pointed out wherein patentable novelty is claimed for certain features of the device, it being understood that within the scope of what hereinafter thus is claimed various changes in form, proportion, size, and minor details of the construction, can be made without departing from the spirit or modifying any of the advantages of the invention.

Figure 2:
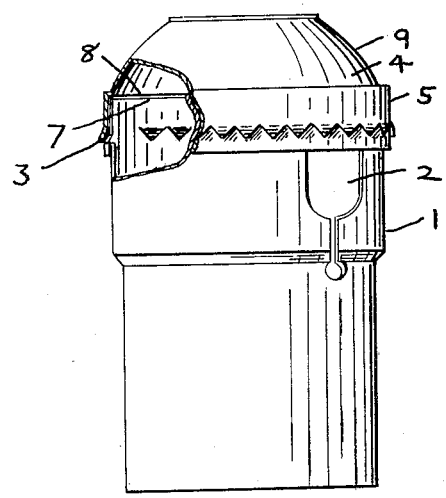
Figure 6:
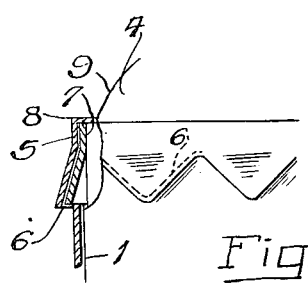
Figure 3:
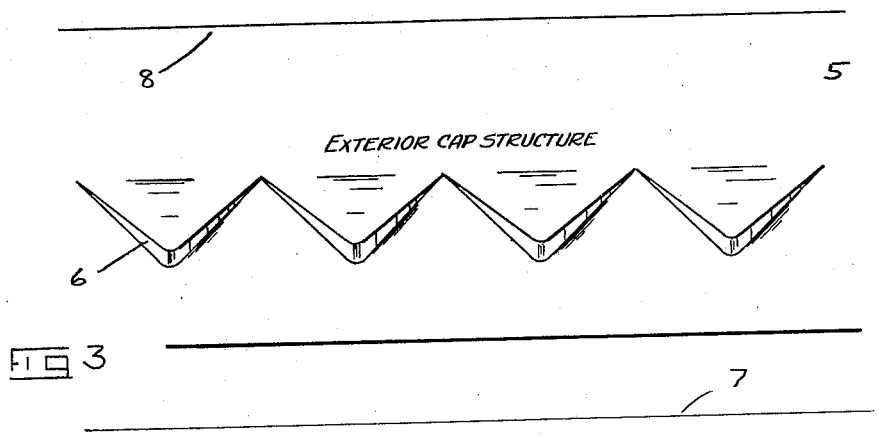
Figure 4:
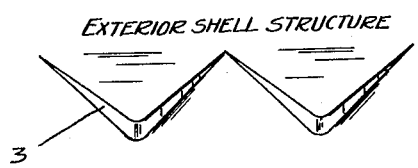
Figure 5:
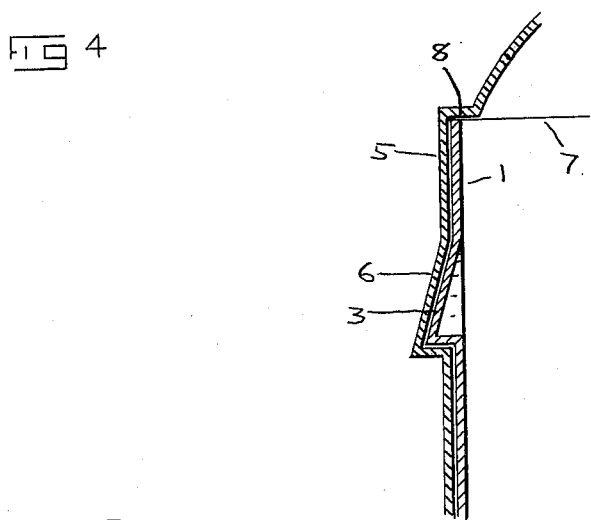

In the drawings illustrating the preferred form of the invention, Figure 1 is a side elevation of separated socket shell parts with broken walls to show interiors partly in cross-section; Figure 2 is the opposite side elevation of the united socket shell parts with broken walls to show, in addition to the interior view of the shell and cap, the outline in cross-section of one of the series of locking formations extending around the flange of the cap and an extra locking unit presented by the shell at that place to more clearly disclose the manner of inter-locking engagement; the Figure 3 is a fragmentary view of the exterior cap structure; the Figure 4 is a fragmentary view of the exterior shell structure; the Figure 5 is a fragmentary view in cross-section of assembled cap and shell structures; and the Figure 6 is a fragmentary view partly in cross-section of cap and shell structures.

An important novel feature of the invention consists in providing the flange of the cap with a series of embossed spaced or closely arranged and outwardly extending imperforate projections, each providing interiorly a V-shaped pair of oblique cam shoulders having their point of convergency facing the rim of the flange. The interior of any of these formations is adapted to receive the exterior of any similar formation provided by the shell, preferably adjacent to the key-slot and at a place diametrically opposite thereto, and such inter-engagement of the imperforate formations provides a positive locking means against the axial separation of the two-part socket shell until external pressure is applied to the resilient portion of the shell adjacent to the key-slot and directly under the formation there located in the shell. The consequence of such inter-locking means is that an axial separation of the parts is thereby not only prevented but, when the annular edge of the shell engages under the annular shoulder provided by the flange adjacent to the dome of the cap, any attempted relative rotary movement of the interlocked parts is positively defeated by that engagement; for a relative rotary movement of the inter-locked parts would necessitate a cam movement as between the inter-engaging oblique shoulders that would movably readjust the parts to a relatively greater overlapping connection which the annular shoulder will not permit.

Referring to the drawings, illustrating the preferred form of the invention in which similar numbers refer to similar parts, the shell 1 is provided with the usual key-slot 2. The upper end of the shell is provided adjacent to the key-slot, and diametrically opposite thereto, with two outwardly extending imperforate formations, each presenting exteriorly a converging pair of oblique shoulders 3 as illustrated by the Figure 4. If in the operation of forming-up these oblique shoulders the tip of the point of convergency is cut and slightly displaced, as illustrated in Figure 6, a more abrupt and effective interlocking means is thereby provided. The cap 4 is provided with a flange 5, as illustrated by Figure 1, and formed therein, and extending entirely around the circumference of this flange is a series of outwardly extended formations, each similar to the formation on the shell already described best illustrated by the Figures 3 and 4, the engaging cam surfaces 6 of these oblique shoulders being presented, however, by the interior of the formation. The formations on the shell are placed in the same relative position with regard to the annular edge 7 of the shell as the formations on the flange of the cap are positioned with regard to the annular shoulder 8 adjacent to the dome 9 of the cap. Therefore when the parts are pushed together axially to interlocked position each displaced tip of the convergent points of the shell formation is made to engage the interior of selected oblique cam shoulders of the cap at the point of convergency thereof where the tip has been outwardly displaced, the annular edge 7 of the shell engaging under the annular shoulder 8 of the flange. If it were not for the inter-engagement of this annular edge and shoulder a relative rotary movement of the inter-locked parts 1 and 4 would cause the oblique shoulders 3 to ride up one side or the other of the oblique cam shoulders 6, but with no head room for the further advance of the shell within the cap the parts are effectually inter-locked against rotation by the same means that inter-locks them against axial separation. The separation of the parts can be effected only by pressing inwardly that part of the shell made resilient by its proximity to the key-slot, whereby that part of the inter-locking means provided by the shell at that point, and projecting into certain of the locking means presented by the cap, may be dislodged from its interlocking engagement. The parts may then be relatively rocked to dislodge the similarly inter-locked formations diametrically across therefrom.

It is most obvious that the formation extending around the flange of the cap can be made to exteriorly present an attractive decoration in bas-relief, and, since the usual exterior or interior ring is not required in its construction, the cap can be produced at a comparatively low manufacturing cost without impairing its high efficiency.

While in the foregoing description the invention has been applied to an electric lamp socket shell for the purpose of illustration, the invention is susceptible of embodiment in various forms of electric and other fixtures and shells where it is desired to separably inter-lock two similar members. Therefore, where in the claims reference is made to a cap and shell the construction is to be broadly construed to include any two similar members capable of overlapping and inter-locking by the means set forth in the above described improvement.

What I claim is:—

1. An electric lamp socket comprising cap and shell members, the cap member having a flange interiorly providing a downwardly facing annular shoulder, a series of spaced outwardly extending projections provided by the flange and interiorly providing intersecting shoulders the diverging ends of which gradually coincide with the inner wall of said flange for engagement by like projections of the shell, the shell projections exteriorly providing intersecting shoulders gradually coinciding with the outer wall of said shell, the shell having a rim of which the edge is engageable with the annular shoulder as a means cooperating with the internested intersecting shoulders for locking the members against relative rotation and separation.

2. An electric lamp socket cap having at its lower end an annuar flange with an annular edge and interiorly providing a downwardly facing annular shoulder above said edge; embossed elements provided by said flange, each element comprising a projection interiorly providing shoulders intersecting adjacent the annular edge of said flange; and a projection provided by a socket shell and engageable at the intersection of the shoulders of one of the embossed elements of said cap flange, the shell having a rim above the shell projection, the edge of said rim being engageable with said annular shoulder of said cap.

3. An electric lamp socket comprising a cap member having an annular flange with an annular edge at its lower end, the flange interiorly providing a downwardly facing shoulder; outwardly extending V-shaped elements provided by the flange, each element interiorly providing intersecting shoulders the diverging ends of which gradually coincide with the inner wall of said flange and joined adjacent said annular edge; and a shell member having an annular rim engageable within said annular flange and against said shoulder; and outwardly extending elements provided by the shell member similar to those provided by the flange, the exteriorly provided shoulders of the shell formation gradually coinciding with the outer wall of said shell and being engageable with the interiorly provided shoulders of the cap formation.

GEORGE HENRY ELWELL.